(12) United States Patent
Parigian

(10) Patent No.: US 6,527,289 B2
(45) Date of Patent: Mar. 4, 2003

(54) REAR SUSPENSION SYSTEM FOR TWO-WHEELED VEHICLES

(76) Inventor: Greg M. Parigian, 10446 Variel Ave., Chatsworth, CA (US) 91311

(*) Notice: Subject to any disclaimer, the term of this patent is extended or adjusted under 35 U.S.C. 154(b) by 0 days.

(21) Appl. No.: 09/917,848

(22) Filed: Jul. 27, 2001

(65) Prior Publication Data
US 2002/0011715 A1 Jan. 31, 2002

Related U.S. Application Data

(63) Continuation-in-part of application No. 09/627,100, filed on Jul. 27, 2000, now abandoned.

(51) Int. Cl.[7] ............................................. B62K 1/00
(52) U.S. Cl. .................. 280/284; 280/285; 180/227
(58) Field of Search ................... 180/219, 227; 280/284, 285, 275, 288

(56) References Cited

U.S. PATENT DOCUMENTS

| | | | | |
|---|---|---|---|---|
| 1,272,399 A | * | 7/1918 | Douglas | 280/284 |
| 3,917,313 A | * | 11/1975 | Smith | 280/284 |
| 4,058,181 A | * | 11/1977 | Buell | 180/32 |
| 4,789,174 A | * | 12/1988 | Lawwill | 280/284 |
| 5,259,637 A | * | 11/1993 | Busby | 280/284 |
| 6,056,307 A | * | 5/2000 | Busby | 280/284 |
| 6,102,421 A | * | 8/2000 | Lawwill | 280/284 |
| 6,131,934 A | * | 10/2000 | Sinclair | 280/284 |

FOREIGN PATENT DOCUMENTS

| | | | | |
|---|---|---|---|---|
| GB | 165568 | * | 7/1921 | 280/284 |
| GB | 767101 | * | 1/1957 | 280/284 |
| IT | 268796 | * | 10/1929 | 280/284 |
| IT | 420946 | * | 5/1947 | 280/284 |

* cited by examiner

Primary Examiner—Daniel G. DePumpo
(74) Attorney, Agent, or Firm—Kelly Bauersfeld Lowry & Kelley, LLP

(57) ABSTRACT

A rear suspension system for two-wheeled vehicles having a generally triangular configuration includes first and second spaced apart support axle plates having aligned apertures receive an axle of a rear wheel of the vehicle. An upper arm assembly is pivotally connected between a vehicle frame and the first and second support axle plates. A lower arm assembly is pivotally connected between the vehicles frame and the first and second support axle plates. First and second control arms are pivotally connected at the respected first ends to the vehicle frame, with the second ends thereof being pivotally connected to the first and second support axle plates, or the lower arm assembly. A shock unit is associated with a pivot arm assembly of the lower arm assembly at one end, and connected to the vehicle frame at the opposite end.

17 Claims, 6 Drawing Sheets

REAR SUSPENSION SYSTEM FOR TWO-WHEELED VEHICLES

RELATED APPLICATION

This application is a continuation-in-part of U.S. application Ser. No. 09/627,100, filed Jul. 27, 2000 now abandoned.

BACKGROUND OF THE INVENTION

The present invention relates generally to two-wheeled vehicles. More particularly, the present invention relates to a rear suspension system for two-wheeled vehicles, such as motorcycles, employing pivoting arm assemblies and control arms possessing shock absorption characteristics and providing lateral stability.

The existing designs of most prior art rear suspension assemblies for two-wheeled vehicles include a rear axle pivot from a single point either from a dual or mono shock system that either extends or compresses the shock unit. In this respect, when the shock system is affected by power or breaking to the rear wheel, system efficiency and stability are compromised. Other systems use a quad-type configuration that only connects to a small section of the frame, providing less structural integrity.

Although recent motorcycle frames include a swing arm configuration, these configurations posses certain deficiencies which detract from their overall utility. The swing arm movement is typically in a pivoting motion upwardly and directed towards the front part of the motorcycle. This causes lateral instability for the rear wheel of the motorcycle. Many existing suspension systems provide inadequate control of wheel contact to the pavement. This can create safety concerns regarding the control of the increased stopping during breaking. Aside from the rear wheel wobbling, as described above, many current designs transfer force back to the front of the vehicle under acceleration.

Accordingly, there is a need for a rear suspension system for a two-wheeled vehicle which improves rear wheel geometry. Such a system should also increase lateral stability of the rear wheel of the vehicle and improve wheel contact with the pavement. Such a system should further contain the power under acceleration and not transfer force back to the front of the vehicle. The present invention fulfills these needs and provides other related advantages.

SUMMARY OF THE INVENTION

The present invention relates to a rear suspension system for two-wheeled vehicles. The system generally comprises first and second spaced apart and parallel support and axle plates, an upper arm assembly pivotally connected to a vehicle frame at a first end and to the support axle plates at the second end, and a lower arm assembly pivotally connected to the vehicle frame at a first end and the first and second support plates at a second end. First and second control arms are pivotally connected at their respective first ends to the vehicle frame, and at their respective second ends to the first and second support axle plates, or the lower arm assembly. The first and second support axle plates include aligned apertures which are configured to receive an axle of a rear wheel of the two-wheeled vehicle. A compressible shock unit is associated with the lower arm assembly, and connected at the opposite end thereof to the vehicle frame. The system has a generally triangular configuration.

The upper arm assembly is typically comprised of a base pivotally connected to the vehicle frame, and having a first elongated arm extending therefrom to a pivotal connection at the first support axle plate. A second elongated arm extends from the base generally parallel to the first arm to a pivotal connection point at the second support plate.

The lower arm assembly includes a base pivotally connected to the vehicle frame, and a first elongated arm extending from the base to a pivotal connection point at the first support axle plate. A second elongate arm extends from the base generally parallel to the first arm to a pivotal connection point at the second support axle plate.

The lower arm assembly includes a pivot arm assembly pivotally connected at a first end to the vehicle frame, and to the first and second arms of the lower arm assembly at the second end thereof. The pivot arm assembly comprises a pair of angular brackets spaced apart and parallel to one another. A shaft extends between first ends of the angular bracket for pivotal connection to the vehicle frame, and another shaft extends through second ends of the brackets for pivotal connection to the first and second arms of the lower arm assembly.

The shock unit is pivotally connected to the pivot arm assembly at one end, and pivotally connected to the vehicle frame generally opposite the pivot arm assembly.

With the system of the present invention, lateral stability is created for the rear wheel of the motorcycle.

Other features and advantages of the present invention will become apparent from the following more detailed description, taken in conjunction with the accompanying drawings, which illustrate, by way of example, the principles of the invention.

BRIEF DESCRIPTION OF DRAWINGS

The accompanying drawings illustrate the invention. In such drawings.

DETAILED DESCRIPTION OF THE PREFERRED EMBODIMENTS

Figure 3:
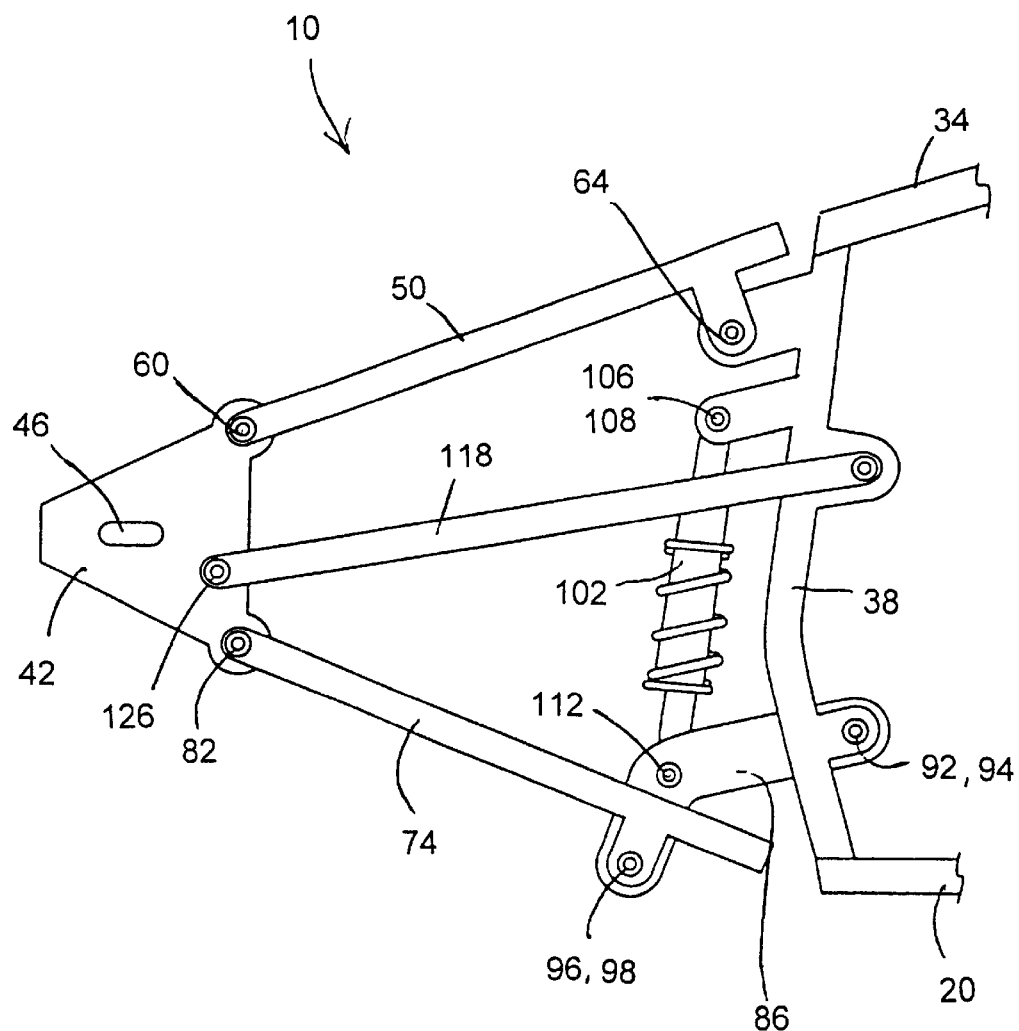
FIG. 3 is a side elevational view of the rear suspension system of FIG. 2, in a relaxed state.
Figure 4:
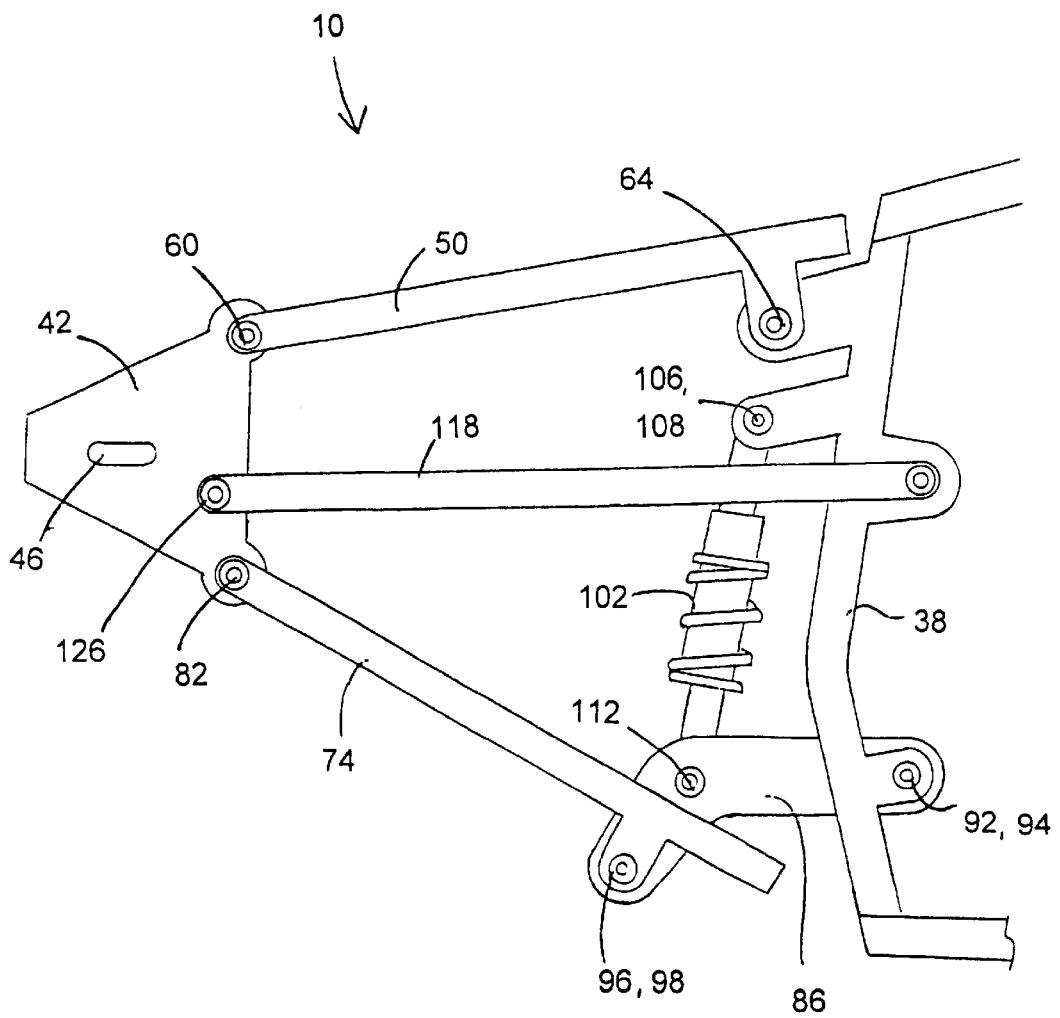
FIG. 4 is a side elevational view of the rear suspension system of FIG. 2, in a compressed state.
Figure 5:
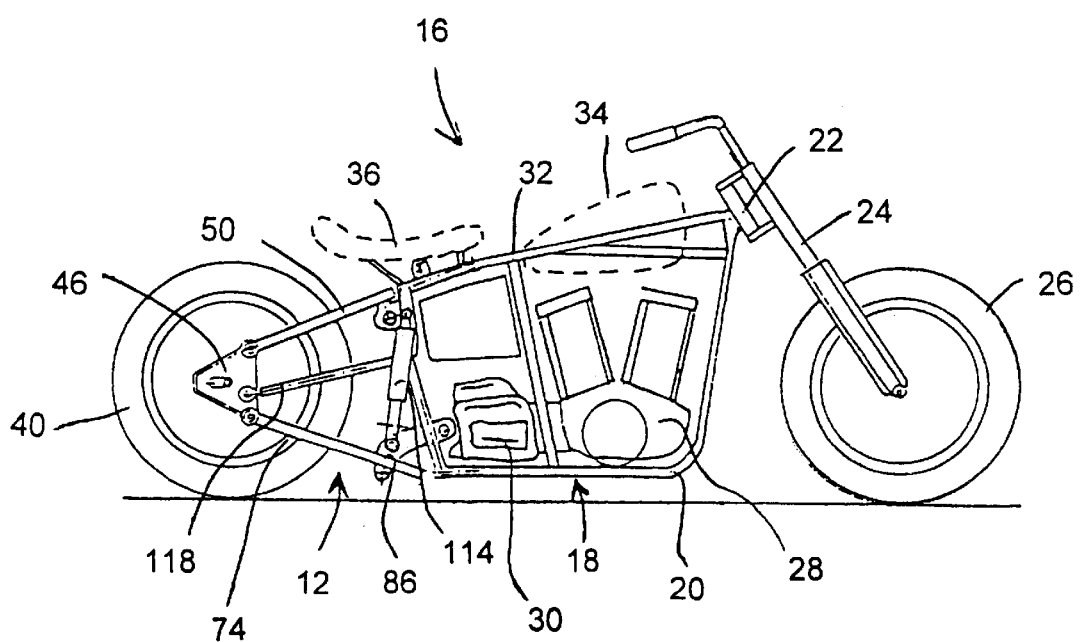
FIG. 5 is a side elevational view of a motorcycle incorporating a rear suspension system embodying the present invention and having external shock units.
Figure 6:
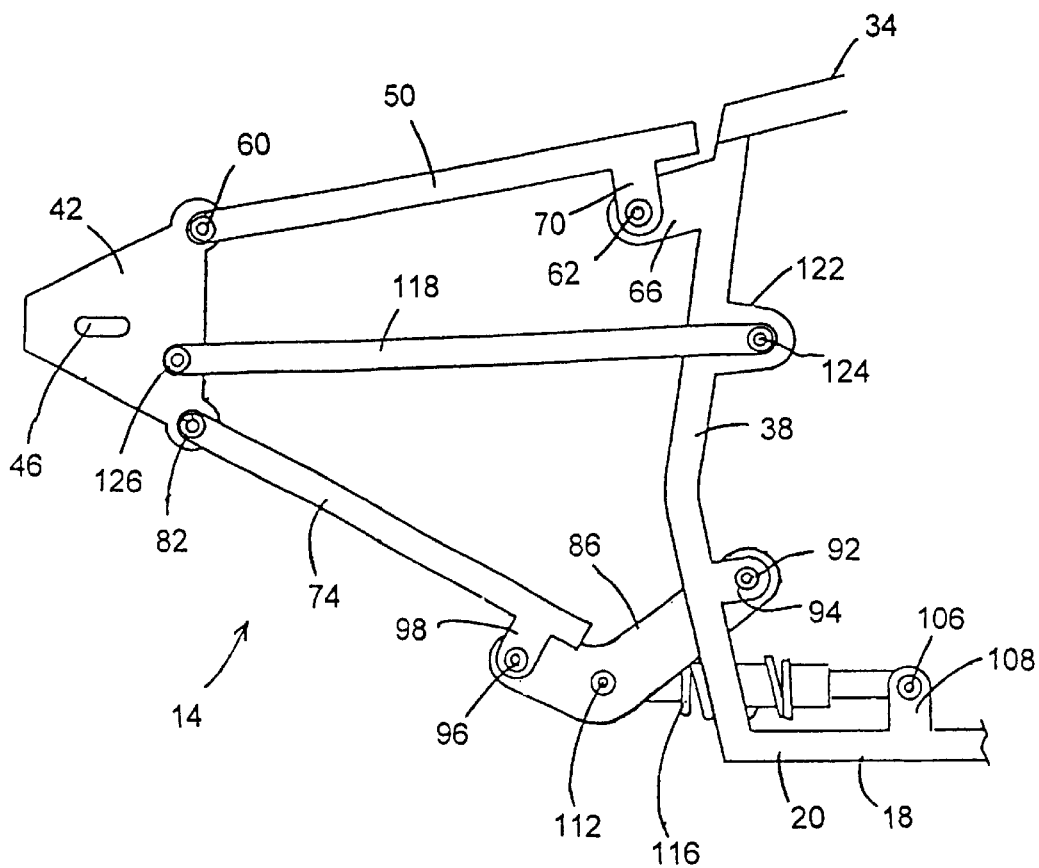
FIG. 6 is a side elevational view of another rear suspension system embodying the present invention and incorporating an internal, horizontally directed shock unit.

As shown in the drawings for purposes of illustration, the present invention is concerned with a rear suspension system for two-wheeled vehicles, generally referred to by the reference number 10 in FIGS. 1–4, by the reference number 12 in FIG. 5, and by the reference number 14 in FIG. 6. The rear suspension system 10–14 is particularly designed and adapted for use in a motorcycle 16, although it could conceivably be incorporated into any two-wheeled vehicle.

Figure 1:
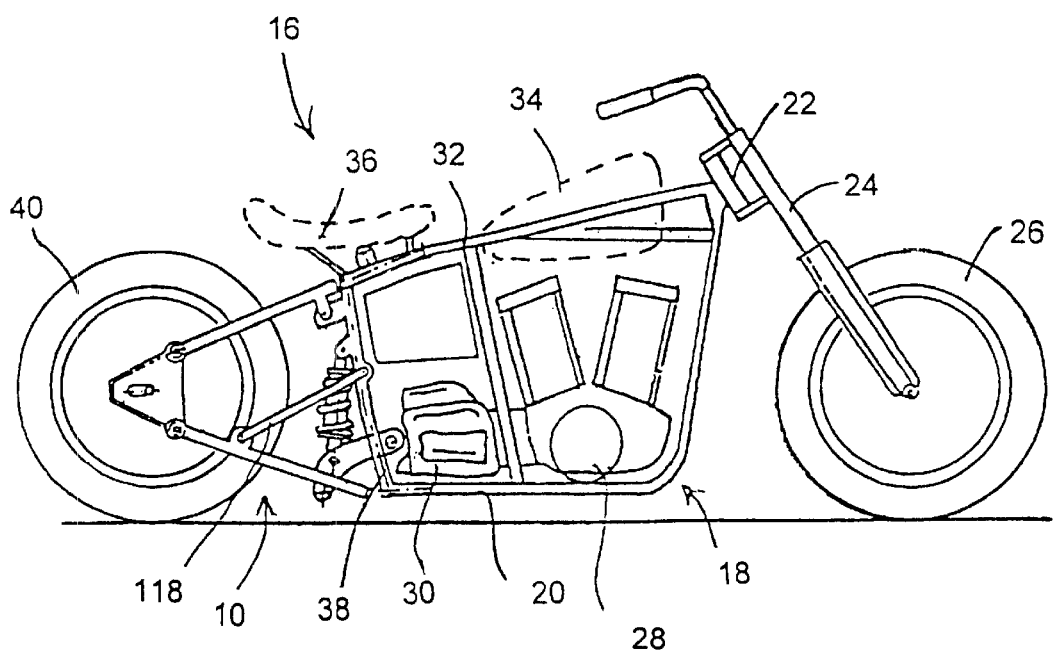
FIG. 1 is a side elevational view of a motorcycle incorporating a rear suspension system embodying the present invention.

With reference to FIG. 1, a motorcycle 16 is illustrated incorporating the rear suspension system 10 of the present invention. The primary structural component of the motorcycle is the frame 18. The frame 18 is typically comprised of two bottom support tubes 20 which are bent at an upwardly directed angle at a front end thereof to a head tube 22. The head tube 22 is connected to a front wheel torque assembly 24 upon which the front wheel 26 is rotatably mounted. The bottom support tubes 20 also provide an anchor and base for the motor 28, transmission 30, etc. A top support tube 32 extends from the head tube 22 towards the rear of the motorcycle 16, and supports the gas tank 34, seat 36, etc. A rear pair of tubes 38 interconnect the top and bottom support tubes 32 and 20, and serve as a rear end of the overall frame 18. Conventionally, the rear suspension is connected to the rear pair of tubes 38 with cross bars or the like. In the present invention, a generally triangular configured triaxial suspension system 10 extends between the rear tubes 38 and the rear wheel 40 of the motorcycle 16.

Figure 2:
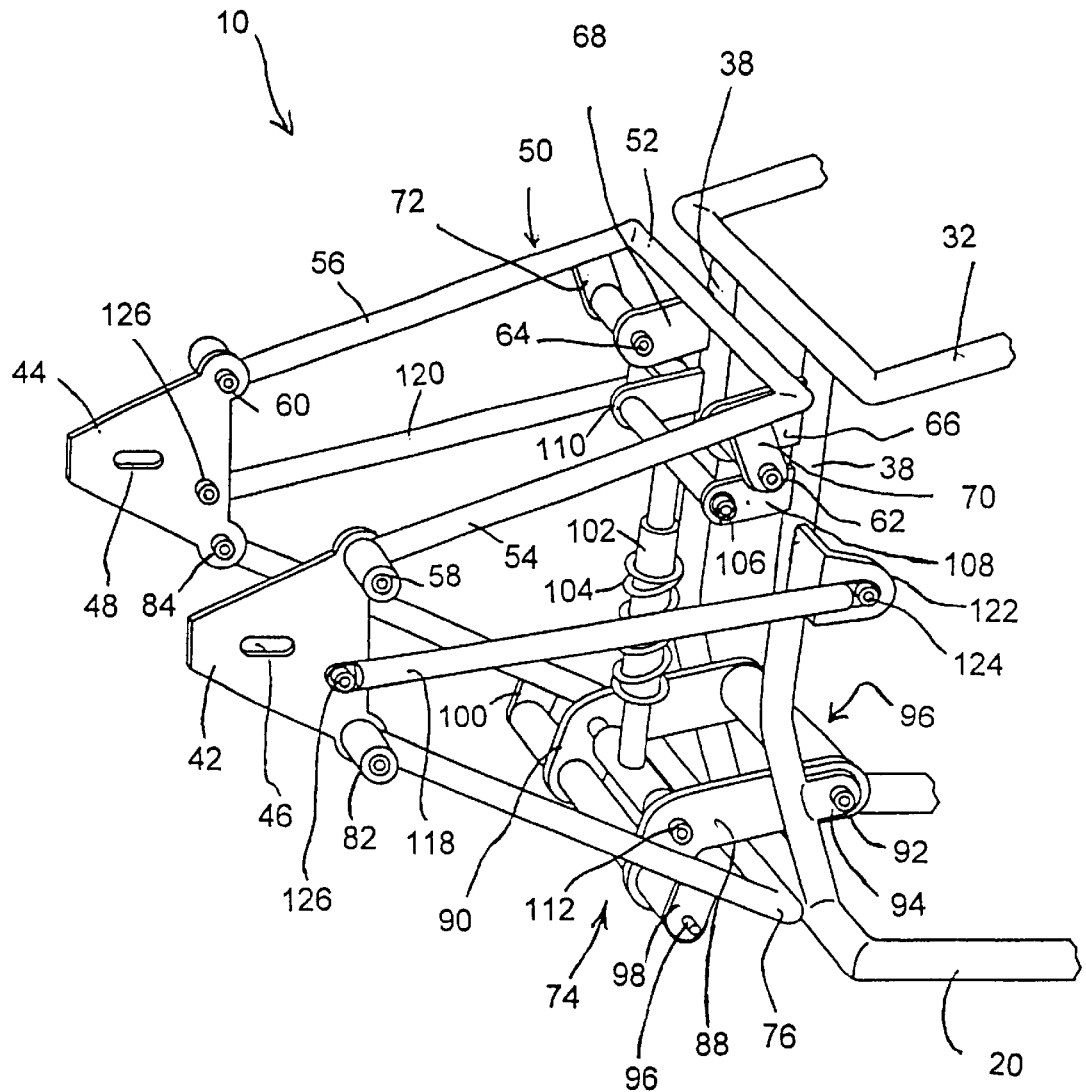
FIG. 2 is a perspective view of the rear suspension system similar to that illustrated in FIG. 1.

With reference to FIGS. 2 and 3, the rear suspension system 10 of the present invention includes a pair of spaced apart and parallel support axle plates 42 and 44 having aligned apertures 46 and 48 which are configured to receive an axle of the rear wheel 40 of the motorcycle 16, or other two-wheeled vehicle. An upper arm assembly 50 is interconnected between the rear tubes 38 of the frame 18 and the axle plates 42 and 44. The upper arm assembly 50 is generally U-shaped, and includes a base 52 having first and second elongated arms 54 and 56 extending therefrom to pivotal connection points 58 and 60 of the axle plates 42 and 44, respectively. Typically, the arms 54 and 56 are connected to an upper portion of the axle plates 42 and 44 using a fastener which allows the arms 54 and 56 to pivot and rotate, such as rocker arm fasteners, pins, bushings, etc. The upper arm assembly 50 is pivotally connected to the rear tubes 38 of the frame 18, typically by pins 62 and 64 extending between upper mounting ears 66 and 68 extending from the rear tubes 38 of the frame 18, and mounting ears 70 and 72 extending from the upper arm assembly 50. Of course, other appropriate means of pivotally connecting the upper arm assembly 50 to the rear portion of the frame 38 can also be used.

A lower arm assembly 74 extends between a lower portion of the rear end 38 of frame 18, and a lower end of each axle plate 42 and 44. The lower arm assembly 74 includes a general U-shaped member having a base 76 and elongated arms 78 and 80 extending from the base 76 to a pivot connection point 82 and 84 on each respective axle plate 42 and 44. Once again a fastener, such as a pin, that allows the lower arm assembly 74 to pivot with respect to the axle plates 42 and 44 is used. The lower arm assembly 74 is pivotally connected to the frame 18 via a pivot arm assembly 86. This assembly 86 is generally H-shaped, and includes two parallel brackets 88 and 90 which are angular and spaced apart from one another so as to be generally parallel to one another. A shaft or pin 92 extends between a first end of the brackets 88 and 90 for pivotal connection to mounting ears 94 extending from the rear frame tubes 38. Similarly, a shaft or pin 96 extends through the opposite ends of the bracket 88 and 90 for pivotal connection to mounting 98 and 100 extending from the lower arm assembly 74, typically towards the base 76 thereof.

A shock unit 102, such as a shock absorber typically having a compressible spring 104, is pivotally interconnected between the rear end tubes 38 of the frame 18 and the pivot arm assembly 86. Typically, this is done by connecting an upper end of the shock unit 102 with an appropriate fastener 106, such as a rotatable pin or the like, to mounting ears 108 and 110 extending from the rear tubes 38 of the frame 18, or any other rear end portion of the frame 18. The opposite end of the shock unit 102 is pivotally attached intermediate ends of the pivot arm assembly brackets 88 and 90. This is done by attaching the appropriate fastener, such as a pin 112 or the like.

Although the suspension system 10 illustrated in FIGS. 1–4 includes an internal mono-unit 102 placed vertically within the suspension system 10, other configurations are possible while still realizing the benefits of the invention. For example, with reference to FIG. 5, a motorcycle 16 is shown having a rear suspension system 12 incorporating a pair of external shock units 114 extending from the rear end of the frame 18 and the pivot arm assembly 86. In this case, each external shock unit 114 would be pivotally attached to each bracket 88 and 90. It is also feasible that a single exterior shock unit, 114 could be used in such an arrangement. FIG. 6 illustrates yet another suspension system 14 in which an internal mono-shock unit 116 is directed generally horizontally between the frame 18 and the pivot arm assembly 86. It will be noted by the reader that in such an arrangement the pivot arm assembly 86 is placed upside down relative to the arrangement in FIGS. 1–4 in order to properly function. Such a shock unit 116 can be designed to extend, rather than compress, in order to damper the shock experienced by the rear wheel 40 of the motorcycle 16 as it rides along an uneven surface.

All of the illustrated suspension systems 10–14 include two control arms 118 and 120 pivotally connected to the rear end of the frame 38 intermediate the upper and lower arm assemblies 50 and 74. A first end of each control arm 118 and 120 is pivotally attached to the rear tubes 38 of the frame 18 by connecting the ends to a mounting ear 122 with a pin 124, or other appropriate fasteners which allow the pivot arms 118 and 120 to pivot with respect to the frame 18. The opposite ends of the control arms 118 and 120 are pivotally connected to either axle plates 42 and 44, or to the elongated arms 78 and 80 of the lower arm assembly 74. This is accomplished using a pin 126 or other appropriate fastener as described above. The control arms 118 and 120 are positioned generally parallel to one another and intermediate upper and lower arm assemblies 50 and 74 and provide lateral strength and maintain a pulling effect on the system 10–14. The control arms 118 and 120 also maintain the pitch or angle of the upper and lower arm assemblies 50 and 74. Thus, the control arms 118 and 120 serve to stabilize the entire system 10–14 so that the rear wheel 40 of the motorcycle, or other two-wheeled vehicle, only travels vertically and does not wobble or veer from side to side. Increasing the torsional capabilities of the rear suspension system 10–14 also substantially improves rear wheel 40 contact with the ground.

It should be understood by the reader that the system 10 can be positioned upside down with minor modifications and still achieve all of the benefits of the invention.

With reference to FIGS. 3 and 4, FIG. 3 illustrates the suspension system 10 in a relaxed state. FIG. 4 illustrates the suspension system 10 in a compressed state, such as when the rear wheel 40 encounters a bump. As the motorcycle 16 moves and is subjected to uneven surface bumps or ruts, the system 10–14 acts in the following manner. The over all movement can best be described as a knee-action movement. As the shock unit 102 is compressed from upper pressure of the wheel 40, the pivot arm assembly 86 is pivoted upwardly about the axis of fasteners 92. This results in the lower arm assembly 74 pivoting in an upward planar motion causing the axle plates 42 and 44 to move upwardly in a planar motion as well. The upper arm assembly 50 also articulates and pivots upwardly in response. The control arms 118 and 120 function to control rotation of the rear axle support plates 42 and 44 and control the planar motion of the lower swings arms 50 and 74, respectively. The upwardly directed planar motion results in a minimal amount of frontal directional movement. The amount of travel of motion of the upward arm is controlled by the shock unit 102. As this pressure is reduced, the system 10 reverses this action and conforms to its balanced pre-shock tension position, as illustrated in FIG. 3. The system 10 maintains tension through the weight of the motorcycle 16 pressing down on the shock unit 102.

The downward rebound pivotal motion of the rear suspension system 10–14 is essentially the reverse of that described above. As the spring shock unit 102 decompresses after rebound, the pivot arm assembly 86 pivots in a downward motion causing the lower arm assembly 74 to move in a downward motion. This in turn causes the axle support plates 42 and 44 to move downwardly, resulting in the upper arm assembly 50 being pulled downward also. The upwardly and downwardly directed motions are eventually ceased by virtue of the shock absorbing unit 102. These same movements and dampening occur regardless of shock type or positioning, or whether the system 10–14 is inverted or positioned "upside down".

Use of the present invention is advantageous over existing rear suspension systems in that improved rear wheeled contact with the ground is achieved. Also, rear wheel control and stability is also greatly increased, resulting in additional safety.

Although several embodiments have been described in some detail for purposes of illustration, various modifications may be made without departing from the scope and spirit of the invention. Accordingly, the invention is not to be limited, except as by the appended claims.

What is claimed is:

1. A rear suspension system for two-wheeled vehicles, comprising:
    a first and second spaced apart and parallel support axle plates;
    an upper arm assembly pivotally connected at a first end to a vehicle frame and at a second end to the first and second support axle plates;
    a lower arm assembly pivotally connected at a first end to the vehicle frame and at a second end to the first and second support axle plates;
    first and second control arms pivotally connected at their respective first ends to the vehicle frame and at respective seconds end to the first and second support axle plates, respectively, or the lower arm assembly; and
    a compressible shock unit associated at one end thereof with the lower arm assembly and connected at the opposite end thereof to the vehicle frame.

2. The suspension system of claim 1, wherein the system has a generally triangular configuration.

3. The suspension system of claim 1, wherein the upper arm assembly is comprised of a base pivotally connected to the vehicle frame and a first elongated arm extending from the base to a pivotal connection point at the first support axle plate, and a second elongated arm extending from the base generally parallel to the first arm to a pivotal connection point at the second support axle plate.

4. The suspension system of claim 1, wherein the lower arm assembly includes a base pivotally connected to the vehicle frame and a first elongated arm extending from the base to a pivotal connection point at the first support axle plate, and a second elongated arm extending from the base generally parallel to the first arm to a pivotal connection point at the second support axle plate.

5. The suspension system of claim 4, wherein the lower arm assembly includes a pivot arm assembly pivotally connected at a first end to the vehicle frame, and pivotally connected at a second end to the first and second arms of the lower arm assembly.

6. The suspension system of claim 5, wherein the pivot arm assembly comprises a pair of angular brackets spaced apart and generally parallel to one another and having a shaft extending between first ends thereof for pivotal connection to the vehicle frame, and a shaft extending through second ends thereof for pivotal connection to the first and second arms of the lower arm assembly.

7. The suspension system of claim 5, wherein the shock unit is pivotally connected to the pivot arm assembly at one end thereof.

8. The suspension system of claim 7, wherein the shock unit is pivotally connected to the vehicle frame at an end of the shock unit generally opposite the pivot arm assembly.

9. The suspension assembly of claim 1, wherein the first support and second axle plates include aligned apertures configured to receive an axle of a rear wheel of the two-wheeled vehicle.

10. A rear suspension system for two-wheeled vehicles, comprising:
    a first and second spaced apart and parallel support axle plates having aligned apertures configured to receive an axle of a rear wheel of the two-wheeled vehicle;
    an upper arm assembly including a base pivotally connected to the vehicle frame and a first elongated arm extending from the base to a pivotal connection point at the first support axle plate, and a second elongated arm extending from the base generally parallel to the first arm to a pivotal connection point at the second support axle plate;
    a lower arm assembly including a base pivotally connected to the vehicle frame and a first elongated arm extending from the base to a pivotal connection point at the first support axle plate, and a second elongated arm extending from the base generally parallel to the first arm to a pivotal connection point at the second support axle plate;
    first and second control arms pivotally connected at their respective first ends to the vehicle frame and at respective seconds end to the first and second support axle plates, respectively, or the lower arm assembly; and
    a compressible shock unit associated at one end thereof with the lower arm assembly and connected at the opposite end thereof to the vehicle frame.

11. The suspension system of claim 10, wherein the system has a generally triangular configuration.

12. The suspension system of claim 10, wherein the lower arm assembly includes a pivot arm assembly pivotally connected at a first end to the vehicle frame, and pivotally connected at a second end to the first and second arms of the lower arm assembly.

13. The suspension system of claim 12, wherein the pivot arm assembly comprises a pair of angular brackets spaced apart and generally parallel to one another and having a shaft extending between first ends thereof for pivotal connection to the vehicle frame, and a shaft extending through second ends thereof for pivotal connection to the first and second arms of the lower arm assembly.

14. The suspension system of claim 12, wherein the shock unit is pivotally connected to the pivot arm assembly at one end thereof.

15. The suspension system of claim 12, wherein the shock unit is pivotally connected to the vehicle frame at an end of the shock unit generally opposite the pivot arm assembly.

16. A rear suspension system for two-wheeled vehicles, comprising:
- a first and second spaced apart and parallel support axle plates having aligned apertures configured to receive an axle of a rear wheel of the two-wheeled vehicle;
- an upper arm assembly including a base pivotally connected to the vehicle frame and a first elongated arm extending from the base to a pivotal connection point at the first support axle plate, and a second elongated arm extending from the base generally parallel to the first arm to a pivotal connection point at the second support axle plate;
- a lower arm assembly including a base pivotally connected to the vehicle frame and a first elongated arm extending from the base to a pivotal connection point at the first support axle plate, and a second elongated arm extending from the base generally parallel to the first arm to a pivotal connection point at the second support axle plate;
- a pivot arm assembly pivotally connected at a first end to the vehicle frame, and pivotally connected at a second end to the first and second arms of the lower arm assembly;
- first and second control arms pivotally connected at their respective first ends to the vehicle frame and at respective seconds end to the first and second support axle plates, respectively, or the lower arm assembly; and
- a compressible shock unit pivotally connected to the pivot arm assembly at one end and to the vehicle frame at an end of the shock unit generally opposite the pivot arm assembly;
- wherein the system has a generally triangular configuration.

17. The suspension system of claim 16, wherein the pivot arm assembly comprises a pair of angular brackets spaced apart and generally parallel to one another and having a shaft extending between first ends thereof for pivotal connection to the vehicle frame, and a shaft extending through second ends thereof for pivotal connection to the first and second arms of the lower arm assembly.

* * * * *